United States Patent [19]
Allen et al.

[11] 3,978,191
[45] Aug. 31, 1976

[54] PROCESS AND APPARATUS FOR PREPARING DOUBLE EDGE ON FLEXIBLE SHEET MATERIAL

[75] Inventors: Alvin E. Allen, Baltimore; Merle I. Hall, Owings Mills, both of Md.

[73] Assignee: Baltimore Aircoil Company, Inc., Jessup, Md.

[22] Filed: Mar. 11, 1974

[21] Appl. No.: 448,793

[52] U.S. Cl. .............................. 264/285; 93/1 E; 156/202; 264/339
[51] Int. Cl.² ..................................... B29C 15/00
[58] Field of Search ........... 264/285, 339, 136, 137, 264/210; 156/202, 204; 93/1 E, 49 N

[56] References Cited
UNITED STATES PATENTS

| | | | |
|---|---|---|---|
| 2,779,388 | 1/1957 | Quoss | 264/285 X |
| 2,781,818 | 2/1957 | Beckman | 156/202 |
| 2,848,751 | 8/1958 | Vernon | 264/284 X |
| 3,399,096 | 8/1968 | Ranger | 156/202 |
| 3,850,085 | 11/1974 | Klemm | 93/49 M |

*Primary Examiner*—Richard R. Kucia
*Attorney, Agent, or Firm*—Michael C. Sudol, Jr.

[57] ABSTRACT

This invention relates to a process and apparatus for applying a double edge to any flexible sheetlike material by bending over a portion of the sheet edge on each side of said sheetlike material. The sheetlike material must then be cured or made rigid by heating. The entire process and the apparatus also is handled as an integral operation with the forming and curing of the flexible sheet.

2 Claims, 10 Drawing Figures

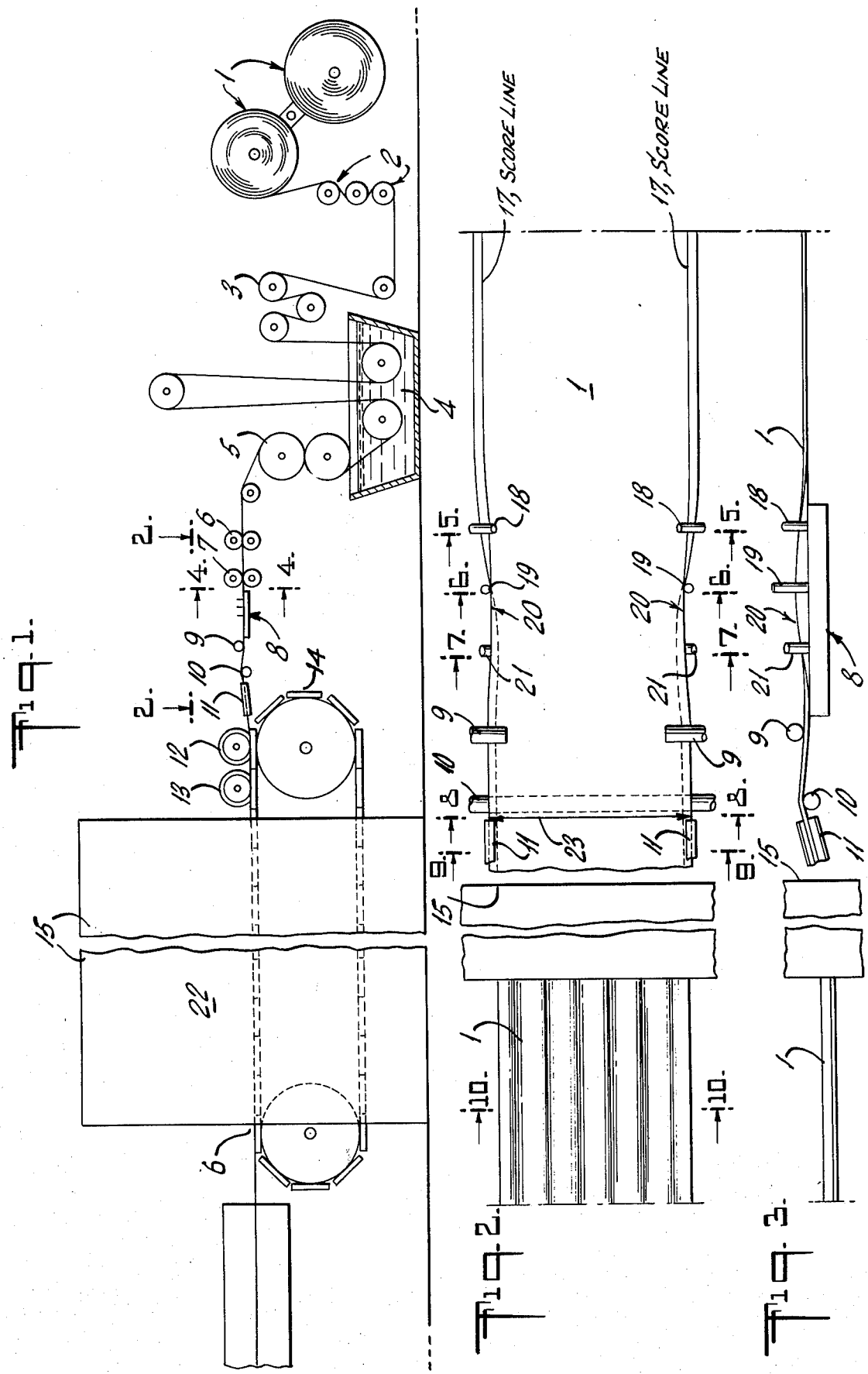

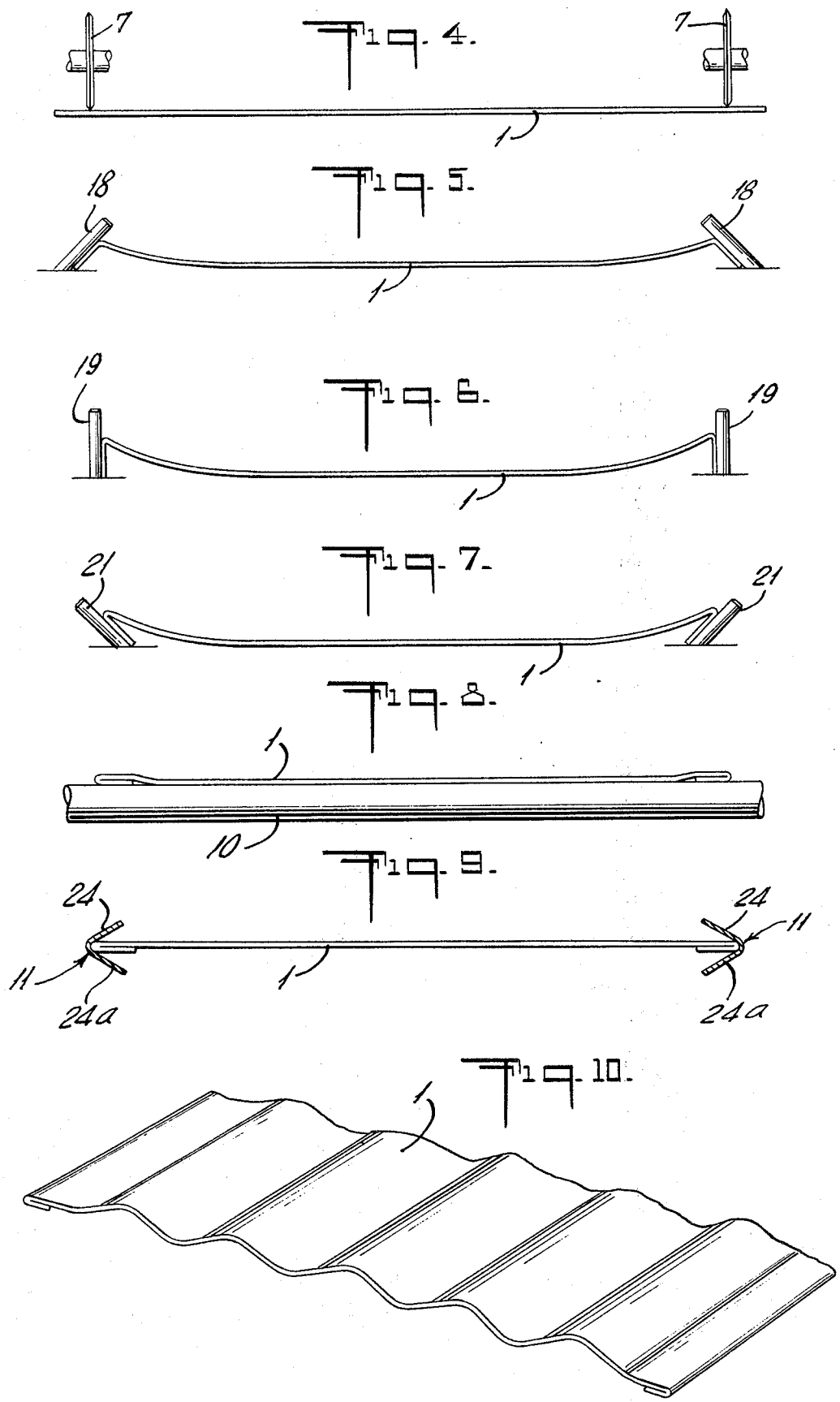

PROCESS AND APPARATUS FOR PREPARING DOUBLE EDGE ON FLEXIBLE SHEET MATERIAL

BACKGROUND OF THE INVENTION

Applicants' invention relates to a process for making a folded edge on each side of a flexible sheetlike material prior to having said sheetlike material formed and cured in an oven to give it a rigid form. The folded edge on each side of said sheet actually results in a double thickness of material on each edge. Although not limited to this aspect, applicants have used this invention to provide folded edge sheet material which is used as fill in a cooling tower. Typical application of applicants' process is shown in FIG. 10 where wavelike sheets of fill material are continuously formed. As shown in FIG. 10, the sheets have a double edge and preparing this double edge is the subject matter of applicants' invention.

Applicants have found that folding over a portion of the sheet edge has provided considerably more strength to the sheet than if a raw edge of the sheet were merely coated with a strength forming compound such as a neoprene compound. Furthermore, applicants have found that if the sheetlike material is being used as fill in a cooling tower and if the edges of the sheet were not folded over to provide additional strength and rigidity, the unfolded edge sheet, when placed in an air stream of 500 – 750 feet/minute velocity, is subject to destructive fluttering and vibration. The problem can be partially solved by coating raw edges with a neoprene compound such as described above but this is an expensive and time consuming process. Also, when a sheet having coated edges only is used in longitudinal configuration as cooling tower fill, the strength added by a thin edge coating is negligible over an uncoated sheet.

SUMMARY OF THE INVENTION

Applicants' invention relates to a process and apparatus for folding over an edge portion of a sheetlike material prior to forming and curing said sheetlike material. Of course, applicants are using the sheetlike material for cooling tower fill but it will be realized by those skilled in the art that the invention is not limited to this particular use and the process and apparatus can be used to put a folded over edge on any flexible sheetlike material which must be made rigid by curing.

Furthermore, applicants' sheetlike material is a neoprene-asbestos paper which is impregnated with a thermosetting resin such as melamine after which time the neoprene-asbestos paper impregnated with melamine is formed into the particular shape desired and cured in an oven. The particular type of curing is pertinent to applicants' invention in that the fill material must be held onto a conveyor flight of the particular shape desired by a change in pressure or by a vacuum. Applicants' invention, however, is not concerned with the particular type of curing process used.

Applicants' invention is further described and shown in FIGS. 1–10. FIG. 1 is a schematic diagram of the entire process and apparatus for manufacturing corrugated sheetlike material. FIG. 2 is a more detailed portion showing the particular apparatus for forming a folded over edge on each side of the sheetlike material prior to curing. This, of course, is the particular process which applicants' invention relates to. FIG. 3 is a side view of the apparatus for forming the folded over edge on each side of the sheet while FIGS. 4–9 are specific diagrams showing the process and apparatus for forming the folded over edge at particular points in the process. Finally, FIG. 10 is an illustrated view of one particular corrugated shape, rigid sheetlike material having a double edge which emerges from the overall process after curing.

Referring now in more detail to FIG. 1, a type of corrugated rigid sheetlike material which applicants use as a cooling tower fill (FIG. 10) is produced by a process depicted therein. For example, rolls of sheetlike material, in applicants' case neoprene-asbestos bound paper 1, is received in rolls and is fed into a conveyor apparatus 14 at the so-called wet end. Through a series of controls and rollers 2 and 3 proper alignment and tension are maintained. The paper is then immersed for a controlled length of time in a bath of thermo-setting resin 4 at fixed temperatures and concentration. This enables the liquid resin to completely penetrate the fibres of the sheetlike material. If sheetlike material without a double edge is to be produced, the paper is then slit 6 for exact width before entering the curing apparatus.

If a sheet having a particular shape is intended the sheet next goes through a forming station 12 and 13. The complexity of the forming station 12 and 13 vary depending on the geometrical configuration of the sheet desired. In applicants' case, rollers 12 and 13 form the sheet pattern as shown in FIG. 10.

The formed sheet is conveyed through an oven 22 on conveyor flights of perforated steel having a shape similar to the required shape of the sheet material. Generally, a pressure differential holds the sheets to the conveyor flights while said flights carry the sheet through the oven. Once the sheets emerge from the oven 16, they are in a generally rigid form and can be used for their appropriate purpose.

Referring now particularly to applicants' process and apparatus for forming the double edge on the sheet, one must view FIGS. 1–9. When the sheet emerges from the thermo-setting resin immersion 4 it is generally squeezed free of excess resin by rollers 5 and then slit to a proper width by slitting blades on rollers 6. In order to place the double edge on the sheet in the integral forming process, a crease is put on each edge of the sheet a proper distance from the edge. This is done by score rolls 7 which, of course, do not cut through the sheet. Generally, applicants, using their sheets for cooling tower fill material, put a crease in about ½ inch to ¾ inch from the edge. Once the sheet material is creased, the edges are folded over by a plurality of pins 8 placed in such a position as to force the paper to fold under at the crease. Generally, to completely fold the paper under requires a plurality of pins in series on each side of the sheet tilted at different angles. Usually, three pins at each side will completely fold under the edges. For example, the first set of pins 18 is generally tilted toward the center of the sheet as one looks down upon the sheet as shown in FIG. 2. This is shown in more detail in FIG. 5. The second set of pins 20 is generally upright and usually results in a 90° fold over at each side of the sheet as shown in FIG. 6. Finally, as the sheet moves along in the process, an outwardly facing set of pins 21 as shown in FIG. 7 just about completes the folding of each edge under the sheet. It is advantageous in applicants' process that the fold in the sheetlike material be underneath as shown in FIG. 8 rather than on top because as the sheet passes on the conveyor flights through the oven the pressure differential which holds the sheet onto the conveyor flight further helps to hold the sheet down on top of the fold for curing purposes.

Once the sheet with the double edge already formed leaves the forming pins, a single or several impression rolls 9 squeeze the paper at the fold and hold the edge under. Further, the tacky surface of the resin on the sheet acts as a temporary adhesive to bind the folded edge to the main sheet.

Following, an idler rod or rods 10 force the sheet to deflect slightly further reinforcing the folding action. The idler rod or rods 10 perform an important function because this slight deflect in the sheet as it moves toward the oven entrance 15 reinforces the folded edge and causes it to remain taut against the bulk or mass of the sheet. Finally, a guide means 11 guides the sheet into the wave forming rollers 12 and 13 to prevent the edge fold from opening up.

In applicants' case, the guide means 11 are merely pieces of metal bent over a center so that there is normally about a 1 to 3 inches wall (24 and 24a) on each side. Each guide piece 11 or guide pan 11 with the openings facing each other is mounted on a frame on each side of the sheet material. The guide pans are mounted apart a distance slightly less than the width of the sheet (23 in FIG. 2). These pieces 11 guide the sheet into the wave forming rollers 12 and 13 and prevent the edge fold from opening up. Once the particular configuration of the sheet is formed by forming rolls 12 and 13 the sheet is fed onto a conveyor flight 14 and a pressure differential across the sheet while it is in the oven 22 causes the bulk of the sheet to rest on the folded edge, and thus hold the edges in place. Of course, once the sheet emerges from the oven 16 it is cured and rigid and the folded edges are rigidly in place as shown in FIG. 9.

There has thus been outlined rather broadly the more important features of the invention in order that the detailed description which preceded may be better understood, and in order that the present contribution to the art may be better appreciated. Those skilled in the art will appreciate that the conception on which this disclosure is based may readily be utilized as the basis for the designing of other arrangements for carrying out the several purposes of the invention. It is important, therefore, that this disclosure be regarded as including such equivalent arrangements as do not depart from the spirit and scope of the invention.

What is claimed is:

1. A process for forming a folded edge on at least one side of a flexible sheet, which sheet is impregnated with a thermo setting resin, formed into a desired shape by forming means and cured in an oven which comprises
   a. creasing said sheet the desired fold distance from an edge;
   b. passing said sheet through a series of at least three pins on each side of said sheet, the first pin being at an acute angle with the sheet such that an extension of the pin is toward the center of the sheet, the second pin being essentially perpendicular to the sheet and the third pin being at an obtuse angle with the sheet such that an extension of the pin is away from the center of the sheet to force the sheet to fold under at the crease;
   c. squeezing said sheet at the fold by means of an impression roll at a folded edge to hold the underfold in position;
   d. deflecting said sheet slightly by means of an idler roll to further reinforce the folding action; and
   e. guiding said sheet into forming means by guides on each side of the sheet to retain the edge fold.

2. Process of claim 1 wherein there are more than three pins on a side of said sheet, each pin being at a progressively larger angle away from the center of the sheet.

* * * * *